(12) United States Patent
Brandstetter et al.

(10) Patent No.: US 8,433,326 B2
(45) Date of Patent: Apr. 30, 2013

(54) RADIO NETWORK AND METHOD FOR TRANSMITTING DATA IN A RADIO NETWORK

(75) Inventors: Josef Brandstetter, Vienna (AT); Christian Ziegler, Vienna (AT)

(73) Assignee: Siemens Aktiengesellschaft, München (DE)

( * ) Notice: Subject to any disclaimer, the term of this patent is extended or adjusted under 35 U.S.C. 154(b) by 490 days.

(21) Appl. No.: 12/525,712

(22) PCT Filed: Jan. 10, 2008

(86) PCT No.: PCT/EP2008/050255
§ 371 (c)(1),
(2), (4) Date: Dec. 8, 2009

(87) PCT Pub. No.: WO2008/095746
PCT Pub. Date: Aug. 14, 2008

(65) Prior Publication Data
US 2010/0105420 A1    Apr. 29, 2010

(30) Foreign Application Priority Data
Feb. 7, 2007   (DE) .......................... 10 2007 006 159

(51) Int. Cl.
*H04W 40/00*   (2009.01)
(52) U.S. Cl.
USPC ........... 455/446; 455/447; 455/448; 455/449; 455/450

(58) Field of Classification Search .......... 455/446–455, 455/41.2, 41.1
See application file for complete search history.

(56) References Cited

U.S. PATENT DOCUMENTS
6,967,936 B1   11/2005   Laroia et al.
2007/0298720 A1*   12/2007   Wolman et al. .............. 455/66.1

FOREIGN PATENT DOCUMENTS
DE   19946540 A1   4/2001
EP   1124347 A2   8/2001
EP   1411675 A1   4/2004

OTHER PUBLICATIONS

Mangold et al., "Coexistence of IEEE 802.11a and ETSI BRAN HiperLAN/2: The Problem of Fair Resource Sharing in the License Exempt Band at 5 GHz", IEEE International Conference on Third Generation Wireless Communications, 3 Gwireless' 2000, Jun. 14-16, 2000, San Francisco, USA, XP 002229523.

* cited by examiner

*Primary Examiner* — Fayyaz Alam

(57) ABSTRACT

In a radio network, in which devices transmitting data seize one of a plurality of available frequency channels for the duration of the data transmission, during breaks between the individual data transmissions the frequency channel used is additionally seized in order to signal the seizure of the frequency channel to devices of another radio network. The seized frequency channel is monitored for the attempt of seizure by a device that is not part of the radio part and the additional seizure of the frequency channel is performed as a function of the detection of such an attempt.

12 Claims, 2 Drawing Sheets

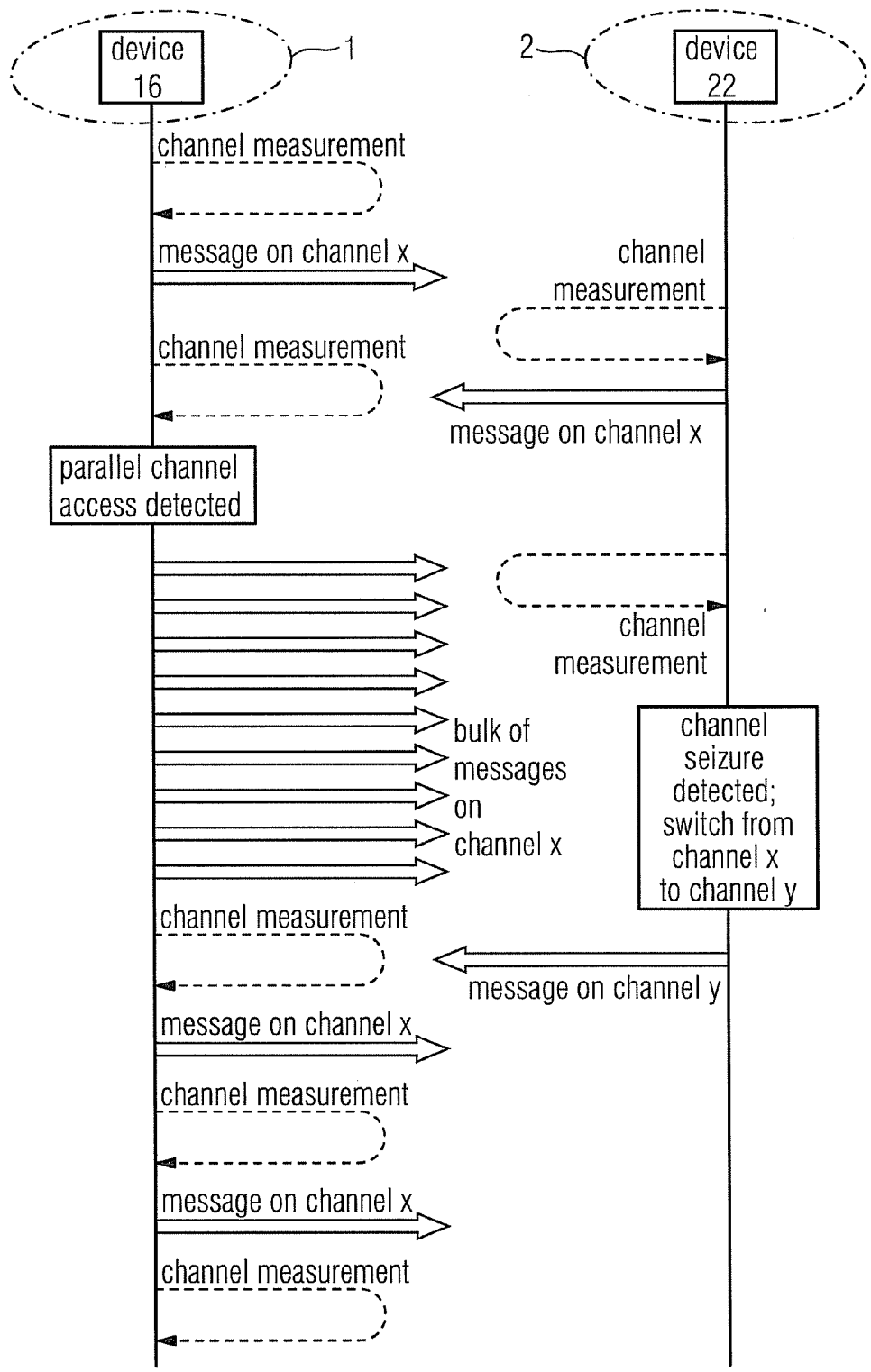

RADIO NETWORK AND METHOD FOR TRANSMITTING DATA IN A RADIO NETWORK

CROSS REFERENCE TO RELATED APPLICATIONS

This application is the US National Stage of International Application No. PCT/EP2008/050255 filed Jan. 10, 2008, and claims the benefit thereof. The International Application claims the benefits of German Patent Application No. 10 2007 006 159.7 DE filed Feb. 7, 2007, both of the applications are incorporated by reference herein in their entirety.

FIELD OF INVENTION

The invention relates to a radio network comprising devices transmitting data, said devices seizing one of several available frequency channels for the duration of the data transmission and comprising a monitoring facility, which also seizes the used frequency channel during pauses between the individual data transmissions.

The invention further relates to a method for transmitting data in a radio network, with devices in the radio network which transmit data seizing one of several available frequency channels for the duration of the data transmission and the used frequency channel also being seized during pauses between the individual data transmissions.

BACKGROUND OF INVENTION

A radio network and/or a method of this type are known from DE 199 46 540 A1.

In many fields, like for instance in industry, science and medicine, self-organizing radio networks and networks without infrastructure, so-called ad-hoc networks, are used increasingly. A known example of a network of this type is the wireless local area network (WLAN) according to the IEEE 802.11 standard. Radio links can be established here at any point between devices (stations), without being dependent upon fixedly installed base stations or a defined radio network design. Links from a station to a target station can be realized in a plurality of possible ways either directly or by means of relay stations. A limited frequency range with a predetermined number of frequency channels is available for the communication, of which only a small number can in turn be used at the same time without any overlap.

To prevent frequency conflict in the case of adjacent or spatially overlapping radio networks, it is known in the case of a radio network to be newly formed that by intercepting the available frequency channels it is determined which of them are already seized in order on this basis to be able to select a free frequency channel. Newly activated devices are however not able to establish the seizure of a frequency band if no data transmission takes place on this frequency at the time of its activation.

With the radio network and/or method known from DE 199 46 540 A1 mentioned in the introduction, provision is made for this reason to additionally seize the used frequency channel during the pauses between individual data transmissions, for instance by means of a burst signal, in order to signal the seizure of the frequency channel to devices in another radio network. In particular, if data is only transmitted sporadically and/or at large time intervals, this known type of additional seizure of the frequency channel is however associated with a relatively high energy consumption.

SUMMARY OF INVENTION

To solve this problem, provision is made in accordance with the invention for the monitoring facility to be embodied in the case of the radio network of the type cited in the introduction so as to monitor the seized frequency channel for an attempted seizure by means of device which does not belong to the radio network and to perform the additional seizure of the frequency channel as a function of the detection of such an attempt.

For the method of the type cited in the introduction, the object is correspondingly achieved such that the seized frequency channel is monitored for an attempted seizure by means of a device which does not belong to the radio network and the additional seizure of the frequency channel takes place as a function of the detection of such an attempt.

The additional seizure of the frequency channel used for the data transmission then only takes place if a device which does not belong to the radio network attempts to seize this frequency channel and this attempt is detected. The method according to the invention is thus particularly advantageous for such radio networks in which data is only transmitted sporadically and/or at large time intervals.

The additional seizure of the frequency channel by means of the existing network can take place for instance in that a sequence of data is sent to an address which is not available in the existing radio network or that data is transmitted in the form of broadcasts and these are forwarded by all routers (relay stations) in the radio network, so that an additional seizure of the frequency channel is produced as a result. Furthermore, the transmission power can be increased during the increase in the seizure. The transmission power can then also be increased in particular if the attempt to seize the frequency channel is detected by a third-party device during a data transmission between the devices in the radio network, because the original transmission power was not sufficiently high for instance in order to signalize the seizure of the frequency channel to the third-party device.

The monitoring of the frequency channel of the existing network can take place in a restricted fashion permanently or temporally in respect of the pauses between individual data transmissions if newly activated devices are not able to determine the seizure of the frequency band. The monitoring of the frequency channel of the existing network and/or the increase in the seizure of the frequency channel can take place by means of all or individual devices of the existing network or by means of separate devices provided herefor.

BRIEF DESCRIPTION OF THE DRAWINGS

To further explain the invention, reference is made below to the figures in the drawing, in which:

FIG. 1 shows a detailed exemplary embodiment of two locally overlapping radio networks and FIG. 2 shows a detailed example of the course of the method according to the invention.

DETAILED DESCRIPTION OF INVENTION

Figure 1:
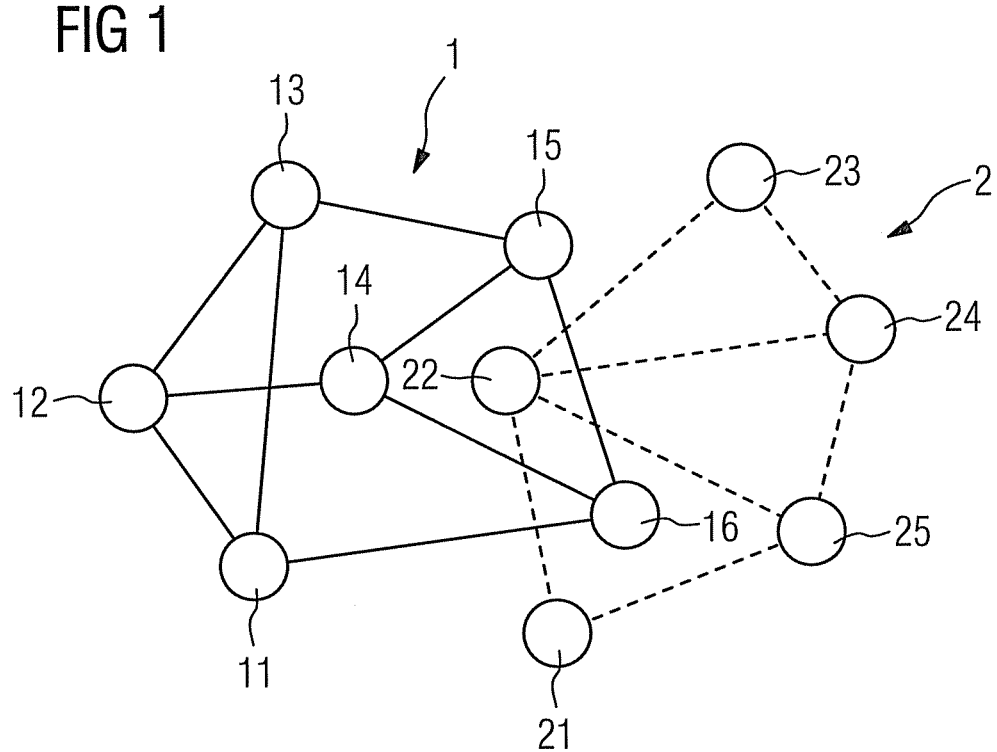

FIG. 1 shows, in a highly diagrammatic manner, first radio network 1 consisting of devices 11 to 16 which communicate with one another in a frequency channel x and a second radio network 2 to be newly formed with the devices 21 to 25.

As shown in FIG. 2, the device 16 in the first radio network 1 communicates sporadically in the frequency channel x and monitors during the pauses therebetween whether a device which does not belong to network 1 is attempting to seize the frequency channel x. If the device 22 of the radio network 2 to be newly formed is activated, it attempts to find a free frequency channel. This can take place such that the device 22 discovers the frequency channel x to be free at this point in time because no data is currently being transmitted in the existing network 1. However as soon as the device 22 attempts to seize the frequency channel x, this is detected by the device 16 in the first network, which consequently performs an additional seizure of the frequency channel x by transmitting a sequence of data. This is in turn identified by the device 22, which consequently switches to another frequency channel y.

The facility 26, 26', which contains the functionality of monitoring the frequency channel x of the existing network 1 and the functionality of the additional seizure of the frequency channel x, may include all or individual devices in the existing network 1 or separate devices provided as extra herefor. For instance an attempted third-party seizure of the used frequency channel z by the active devices in each instance, e.g. 16, of the network 1, can be detected and notified to a separate device 27, which then performs the additional seizure of the frequency channel x.

The invention claimed is:

1. A radio network, comprising:
   frequency channels;
   devices transmitting data which use one of the frequency channels for a duration of a data transmission; and
   a monitoring facility which additionally seizes the used frequency channel during pauses between data transmissions, wherein
   the monitoring facility is configured
      to monitor the used frequency channel for an attempted seizure by a device which does not belong to the radio network and
      to perform an additional seizure of the frequency channel as a function of a detection of the attempted seizure by the device which does not belong to the radio network.

2. The radio network as claimed in claim 1, wherein the monitoring facility is configured to increase a transmission power during the additional seizure.

3. The radio network as claimed in claim 1, wherein the monitoring facility is configured to perform the monitoring of the frequency channel of the radio network during the pauses between the data transmissions.

4. The radio network as claimed in claim 2, wherein the monitoring facility is configured to perform the monitoring of the frequency channel of the radio network during the pauses between the data transmissions.

5. The radio network as claimed in claim 1, wherein the functionality of the monitoring of the seized frequency channel for an attempted seizure by a device which does not belong to the radio network and the functionality of the additional seizure of the frequency channel are implemented in at least one of the devices of the radio network.

6. The radio network as claimed in claim 1, wherein the functionality of the monitoring of the seized frequency channel for an attempted seizure by means of a device which does not belong to the radio network is implemented in at least one of the devices of the radio network and the functionality of the additional seizure of the frequency channel is implemented in a device which is separate from the radio network.

7. The radio network as claimed in claim 1, wherein the functionality of the monitoring of the seized frequency channel for an attempted seizure by means of a device which does not belong to the radio network is implemented in a device which is separate from the radio network and the functionality of the additional seizure of the frequency channel is implemented in the at least one of the devices in the radio network.

8. The radio network as claimed in claim 1, wherein the functionality of the monitoring of the seized frequency channel for an attempted seizure by a device which does not belong to the radio network and the functionality of the additional seizure of the frequency channel are implemented in a device which is separate from the radio network.

9. A method for transmitting data in a radio network, comprising:
   providing several frequency channels and devices transmitting data;
   using one of the several frequency channels for a duration of a data transmission by the devices, the used frequency channel also being seized during pauses between data transmissions,
   monitoring the used frequency channel for an attempted seizure by a device which does not belong to the radio network, wherein an additional seizure of the frequency channel takes place as a function of a detection of the attempted seizure by the device which does not belong to the radio network.

10. The method as claimed in claim 9, further comprising: increasing a transmission power during the additional seizure.

11. The method as claimed in claim 9, wherein the monitoring of the used frequency channel of the radio network takes place in the pauses between the data transmissions.

12. The method as claimed in claim 10, wherein the monitoring of the seized frequency channel of the radio network takes place in the pauses between the data transmissions.

* * * * *